(No Model.) 2 Sheets—Sheet 1.
B. B. HOFFMAN.
ELECTRIC LIGHT FOR BICYCLES.
No. 559,801. Patented May 12, 1896.
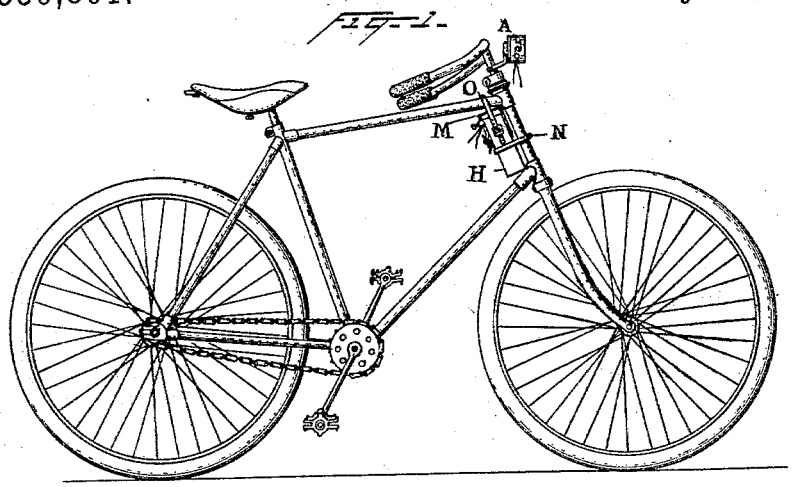
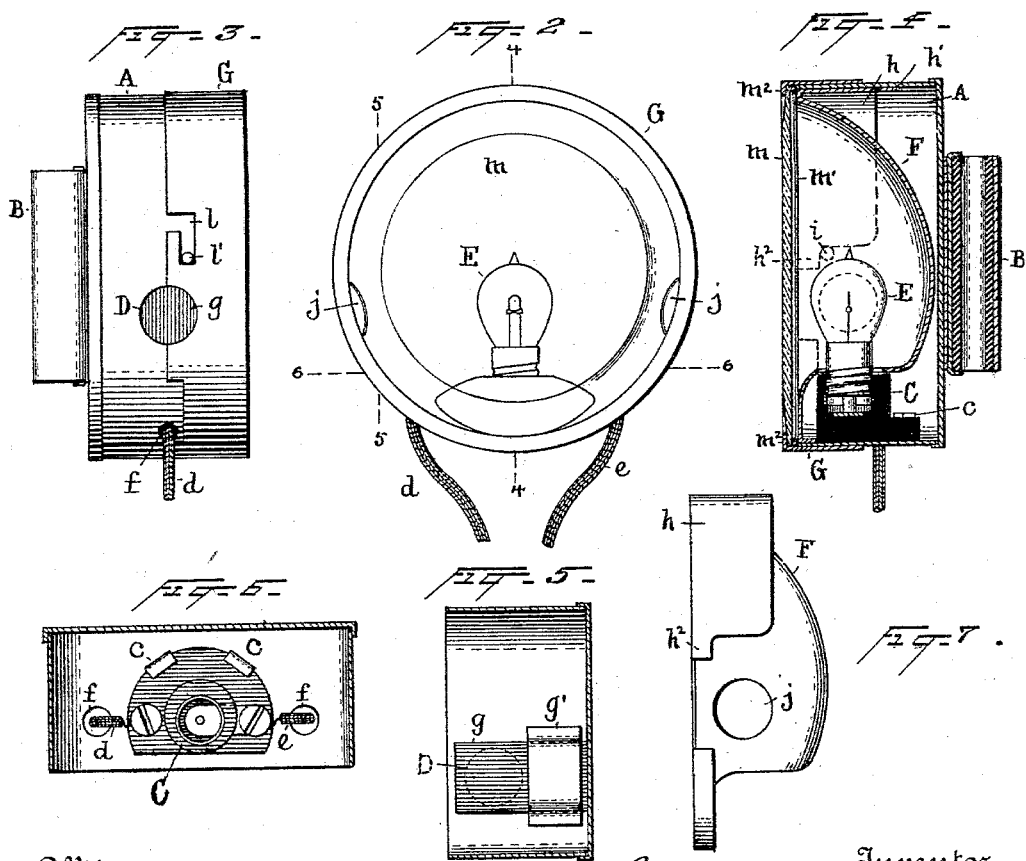
Witnesses
Norris H. Clark
John R. Taylor
Inventor
Benjamin B. Hoffman,
By his Attorneys
Dyer & Driscoll

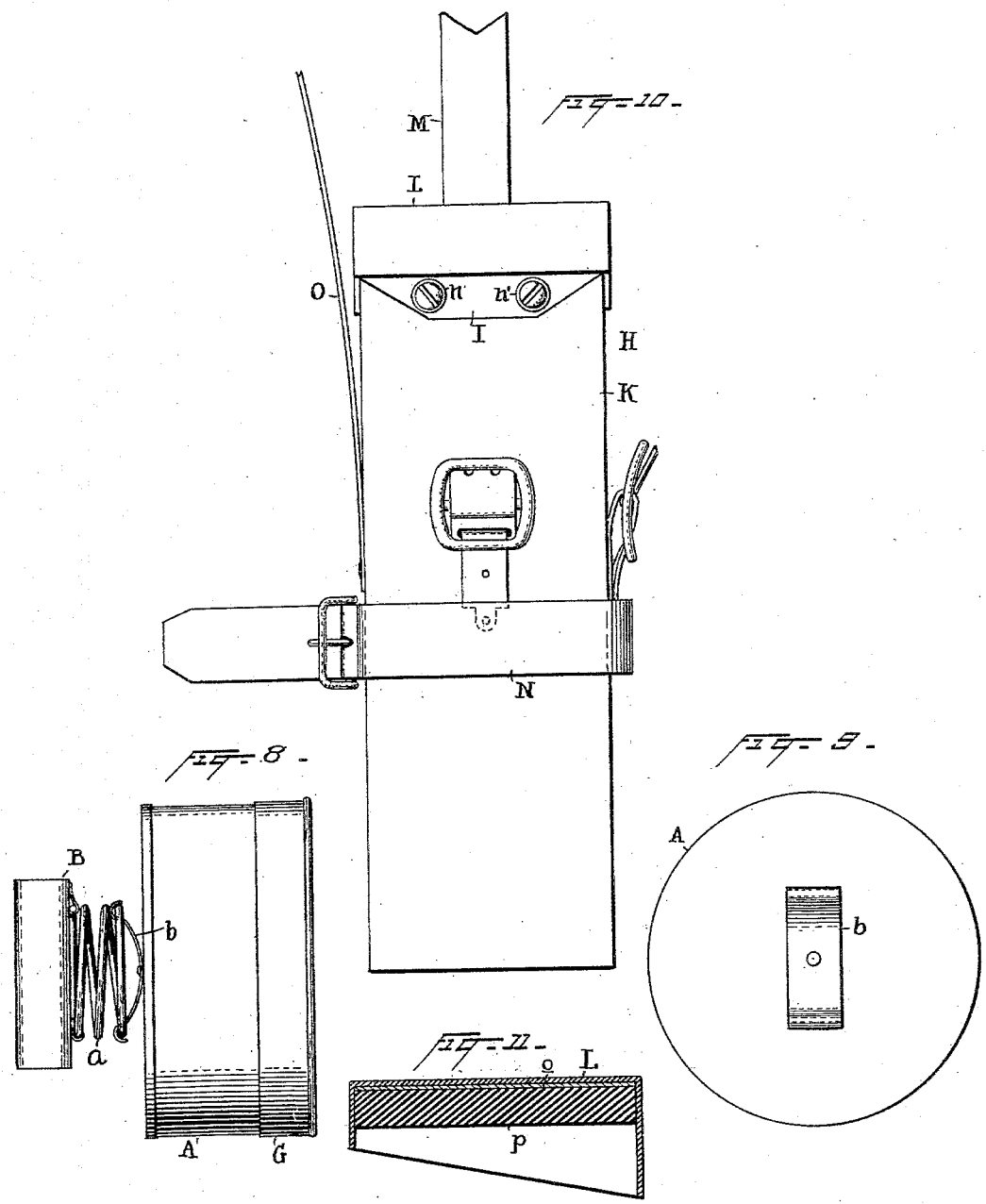

UNITED STATES PATENT OFFICE.

BENJAMIN B. HOFFMAN, OF NEW YORK, N. Y.

ELECTRIC LIGHT FOR BICYCLES.

SPECIFICATION forming part of Letters Patent No. 559,801, dated May 12, 1896.

Application filed May 24, 1895. Serial No. 550,476. (No model.)

*To all whom it may concern:*

Be it known that I, BENJAMIN B. HOFFMAN, a citizen of the United States, residing at New York city, in the county and State of New York, have invented a certain new and useful Improvement in Electric Lights for Bicycles, of which the following is a specification.

The object I have in view is to provide an electric light for bicycles in which both the electric lamp and the battery will be mounted upon and carried by the bicycle, and which shall be light and compact, ornamental in appearance, efficient in operation, and not liable to get out of order.

In the accompanying drawings, forming a part hereof, Figure 1 is a side view of a bicycle with my electric light mounted thereon. Fig. 2 is a front view of the lantern; Fig. 3, a side view of the lantern; Fig. 4, a vertical section of the lantern on line 4 4 in Fig. 2; Fig. 5, a vertical section on line 5 5 in Fig. 2. Fig. 6 is a horizontal section on line 6 6 in Fig. 2 through the outer case of the lantern, showing the location of the lamp-socket. Fig. 7 is an edge view of the reflector. Fig. 8 is a side view of the lantern, showing the supporting-hook socket flexibly connected therewith. Fig. 9 is a back view of the lantern of Fig. 8, showing the clip for connecting with the supporting-spring. Fig. 10 is a rear elevation of the battery with its case and securing-straps, and Fig. 11 is a sectional view of the battery-cover.

The lantern, which is to be placed upon the lantern-hook of the bicycle as usual and as illustrated in Fig. 1, is composed of a circular outer case A, closed at its back and open on its front side. To the back of this case is attached the socket B for engaging the lantern-hook of the bicycle. This socket is preferably connected with the center of the back of the case A by a flexible support composed of a spiral spring $a$, connecting the case A and the hook-socket, as shown in Figs. 8 and 9. This spring is preferably permanently secured to the hook-socket and removably secured to the case A by means of a clip $b$, with the ends of which the spring engages. This clip may, however, be replaced by permanent connection between the spring and case A. By having the lantern removable from the hook-socket the lantern can be removed from the bicycle by detaching it from the hook-socket, which may remain in position on the lantern-hook of the bicycle. The flexible connection between the hook-socket and the lantern, formed by the spiral spring, reduces greatly the jar upon the parts of the lantern, which is especially desirable on account of the necessarily fragile character of the electric lamp.

In the bottom of the circular case A is placed a small electric-lamp socket C, which is removably held by clips $c$ and by the circuit-wires $d\ e$, which pass through openings $f$ in the bottom of the case A and are secured to binding-screws on the socket. These circuit-wires $d\ e$ are flexible conductors and may be twisted together outside of the lantern to form a flexible cord. In the sides of the case A are formed side light-openings D, which are covered by pieces of colored glass $g$, held by metal straps $g'$, secured to the inner side of the case A. These side light-openings are preferably arranged opposite the center of light emitted by the small incandescent electric lamp E, which is removably held by the socket C. Within the case A is placed the removable concave reflector F, provided with a partial circular rim $h$, which fits closely the upper half of the case A, which it enters and in which it meets a stop $h'$ for limiting its entrance into the case. The bottom of the reflector is shaped to fit over the lamp-socket C and is provided with an opening through which the lamp projects and which permits the lamp to be inserted in and removed from the lamp-socket. The ends $h^2$ of the rim $h$ engage with projections $i$ on the inner side of the case A to prevent axial movement of the reflector in the case.

Opposite the side light-openings D in the case A the reflector is provided with openings $j$, so as to permit the light from the electric lamp to be seen at the sides of the lantern. The front of the lantern is closed by a cap G, which fits over the case A and engages, by means of slots $l$, with pins $l'$, projecting from the case, such slots and pins forming bayonet-fastenings. The cap G is cut away at the side light-openings D and also at the openings $f$ for the circuit-conductors, as shown in Fig. 3. The cap G is provided with a glass front plate $m$, the glass being held by a wire ring $m'$ and by the overturned edge $m^2$ of the metal portion of the cap.

To insert the electric lamp in the lantern, it is necessary to remove the cap, which can be done by turning it so as to disengage the bayonet-fastenings. When the parts of the lantern are put together, the electric lamp E is inclosed within it between the reflector F and the glass front of the lantern and with its light-giving portion opposite the side light-openings. The lantern can be readily taken apart by first removing the cap G, then unscrewing the electric lamp from the socket, and then withdrawing the reflector F from the case A. The socket can then be removed by disconnecting the wires $d\ e$ from the binding-screws, when the socket can be drawn forward away from engagement with the clips $c$.

The circuit-wires $d\ e$ extend from the lantern and connect with the binding-posts $n\ n'$ on the battery H. This battery is a rectangular battery composed, preferably, of two cells of the standard chlorid-of-lead storage battery, which are inclosed in a rectangular hard-rubber case I and are connected with the binding-posts in series. The battery-case is inclosed within a protecting leather case K, which is constructed to closely fit the battery-case and to cover it completely except at the points where the binding-posts project from it. The battery-case and the leather case are closed by a cap L, of leather, which is provided under its leather top with a metallic plate $o$, preferably of steel, so as to obtain the greatest rigidity with the minimum weight, and below this there is secured in the cap a block of pure rubber gum $p$, which bears upon the top of the battery-case. A leather strap M, secured at its ends to the battery-case and passing over the cover, is designed to draw the cover tightly down to place, compressing the rubber block against the upper open end of the battery-case and preventing the escape of the battery liquid should any leakage occur through the ordinary sealing of the battery-cells.

The battery is secured in position on the bicycle by a horizontal strap N, which is secured to the leather case at its ends and is adapted to pass around the steering-head of the bicycle-frame. A vertical strap O, which is also secured at both ends to the leather case of the battery, passes over the upper rod of the bicycle-frame, or, in the case of a lady's bicycle, will be reversed and pass over the lower rod of the frame. By this means the battery is secured firmly in position against the steering-head of the bicycle and where it will least interfere with the operation of the machine or the carrying of other articles. The lantern-hook may be on the bicycle-head or on the fork of the bicycle, the flexible cord being made of sufficient length to reach from the lantern to the battery in either case.

What I claim is—

1. In an electric light for bicycles, the combination of a lantern-case, a reflector removably secured therein, a lamp-socket removably secured in said case and located entirely beneath said reflector, and a lamp carried in said socket and extending through the lower wall of said reflector, whereby when the lamp is removed from its socket the reflector can be removed, substantially as set forth.

2. In an electric light for bicycles, the combination of a lantern-case, a reflector removably secured therein, spring-clips $c, c$, in said case, a lamp-socket secured by said clips beneath said reflector, and a lamp carried in said socket and extending through the lower wall of said reflector, substantially as set forth.

3. In an electric light for bicycles, the combination with the circular case A, of the removable concave reflector F having the rim $h$ fitting the case, the removable cap G provided with a glass front, the side light-openings D, the lamp-socket C, and the incandescent electric lamp E, substantially as set forth.

This specification signed and witnessed this 23d day of May, 1895.

BENJAMIN B. HOFFMAN.

Witnesses:
JOHN R. TAYLOR,
EUGENE CONRAN.